United States Patent
Ryu et al.

(10) Patent No.: US 9,290,163 B2
(45) Date of Patent: Mar. 22, 2016

(54) PEDAL FEELING ADJUSTING DEVICE

(71) Applicant: MANDO CORPORATION, Pyeongtaek-Si (KR)

(72) Inventors: Dong-Yo Ryu, Seongnam-si (KR); Jin-Seok Kim, Suwon-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/306,762

(22) Filed: Jun. 17, 2014

(65) Prior Publication Data

US 2015/0166023 A1 Jun. 18, 2015

(30) Foreign Application Priority Data

Dec. 13, 2013 (KR) .................. 10-2013-0155089

(51) Int. Cl.
*B60T 8/40* (2006.01)
*B60T 7/04* (2006.01)
*B60T 13/66* (2006.01)
*B60T 13/68* (2006.01)
*B60T 15/36* (2006.01)

(52) U.S. Cl.
CPC ............ *B60T 7/042* (2013.01); *B60T 8/409* (2013.01); *B60T 13/662* (2013.01); *B60T 13/686* (2013.01); *B60T 15/36* (2013.01); *B60T 8/4081* (2013.01)

(58) Field of Classification Search
CPC ...... B60T 8/4081; B60T 8/4086; B60T 8/409
See application file for complete search history.

(56) References Cited

U.S. PATENT DOCUMENTS

| 4,425,005 A * | 1/1984 | Warwick ........................... 303/3 |
| 2004/0061375 A1 * | 4/2004 | Drott et al. ...................... 303/20 |
| 2004/0181381 A1 * | 9/2004 | Matsuhashi ....................... 703/7 |
| 2010/0181152 A1 * | 7/2010 | Anderson et al. .............. 188/152 |
| 2013/0080017 A1 * | 3/2013 | Bohm ............................. 701/78 |
| 2014/0131154 A1 * | 5/2014 | Ganzel ............................ 303/14 |
| 2014/0157771 A1 * | 6/2014 | Jeon et al. ....................... 60/591 |
| 2014/0230429 A1 * | 8/2014 | Kim et al. ....................... 60/553 |
| 2014/0361473 A1 * | 12/2014 | Ryu et al. .................... 267/140.2 |

FOREIGN PATENT DOCUMENTS

| EP | 2548776 B1 * | 5/2015 |
| KR | 10-0657576 | 12/2006 |

* cited by examiner

*Primary Examiner* — Thomas J Williams
(74) *Attorney, Agent, or Firm* — Ladas & Parry, LLP

(57) ABSTRACT

Disclosed herein is a pedal feeling adjusting device. According to an embodiment of the present invention, the pedal feeling adjusting device that adjusts pedal feeling provided to a driver by an oil pressure generated in accordance with pedal effort of the driver, includes a pedal simulator that includes a simulator block in which an oil hole connected to a master cylinder through a flow path is formed on an upper portion thereof to receive the oil pressure in accordance with the pedal effort of the driver and bores are formed therein to contact the oil hole, a damping housing coupled to seal the bores, first and second pistons provided in series in the bores to be compressed by oil and slidably moved, and an elastic member supported by the damping housing and compressed in accordance with movement of the first and second pistons to provide a reaction force, a hydraulic flow path that is connected to the flow path to provide the oil pressure between the first and second pistons, and a control valve that is provided in the flow path to control the oil pressure to be selectively provided to the oil hole or the hydraulic flow path. Here, the first and second pistons are formed to have mutually different diameters.

9 Claims, 4 Drawing Sheets

PEDAL FEELING ADJUSTING DEVICE

CROSS-REFERENCE TO RELATED APPLICATION

This application claims the benefit of Korean Patent Application No. 10-2013-0155089, filed on December 13, 2013 in the Korean Intellectual Property Office, the disclosure of which is incorporated in its entirety herein by reference.

BACKGROUND

1. Field

Embodiments of the present invention relate to a pedal feeling adjusting device, and more particularly to, a pedal feeling adjusting device that can adjust a pedal stroke distance and a reaction force of a pedal simulator.

2. Description of the Related Art

In general, in a braking device, a pedal simulator is adopted in order to provide pedal feeling to a driver so that a reaction force is given to a brake pedal. Such a pedal simulator is connected to a master cylinder, and pressurized by an oil pressure according to pedal effort of the brake pedal to thereby provide a repulsive force to the brake pedal.

For example, as disclosed in Korean Patent Registration No. 10-0657576, the pedal simulator is achieved in such a manner as to buffer a simulator piston using two springs as a buffering member inside the pedal simulator. However, such two springs represent the pedal feeling of a brake simply in the form of a linear primary straight line, and therefore required pedal feeling cannot be provided.

In addition, in a conventional pedal simulator, performance of a spring providing the reaction force is predetermined, so that the pedal feeling of the driver cannot be adjusted.

The related art includes Korean Patent Registration Patent No. 10-0657576 (Date of patent: Dec. 7, 2006)

SUMMARY

Therefore, it is an aspect of the present invention to provide a pedal feeling adjusting device that can adjust a stroke distance and reaction force of a pedal simulator in which pistons with mutually different diameters are arranged in series and an oil pressure is selectively supplied to the pistons having mutually different diameters by changing a flow path through a hydraulic valve to thereby provide pedal feeling.

Additional aspects of the invention will be set forth in part in the description which follows and, in part, will be obvious from the descriptions, or may be learned by practice of the invention.

In accordance with one aspect of the present invention, a pedal feeling adjusting device that adjusts pedal feeling provided to a driver by an oil pressure generated in accordance with pedal effort of the driver, includes: a pedal simulator that includes a simulator block in which an oil hole connected to a master cylinder through a flow path is formed on an upper portion thereof to receive the oil pressure in accordance with the pedal effort of the driver and bores are formed therein to contact the oil hole, a damping housing coupled to seal the bores, first and second pistons provided in series in the bores to be compressed by oil and slidably moved, and an elastic member supported by the damping housing and compressed in accordance with movement of the first and second pistons to provide a reaction force; a hydraulic flow path that is connected to the flow path to provide the oil pressure between the first and second pistons; and a control valve that is provided in the flow path to control the oil pressure to be selectively provided to the oil hole or the hydraulic flow path, wherein the first and second pistons are formed to have mutually different diameters.

Here, the control valve may be provided as a normal close type solenoid valve that is usually maintained in a closed state and opened by a control.

Also, the first piston may have a smaller diameter than that of the second piston.

Also, the bores may be constituted of a first bore in which the first piston is disposed and which has a diameter corresponding to the diameter of the first piston and a second bore in which the second piston is disposed and which has a diameter corresponding to the diameter of the second piston.

Also, when the oil pressure is provided through the oil hole, a large force may be generated by a short pedal stroke by pressing the first piston having the relatively smaller diameter, thereby providing a hard pedal feeling, and when the oil pressure is provided through the hydraulic flow path, a small force may be generated by a long pedal stroke by pressing the second piston having the relatively larger diameter, thereby providing a soft pedal feeling.

Also, a sealing member may be provided in the first and second pistons so as to seal gaps between the first piston and the first bore and between the second piston and the second bore.

Also, the elastic member may include a reaction force spring that is provided between the second piston and the damping housing and compressed by the first and/or second piston, and a damping member that is provided in the damping housing and elastically deformed in such a manner as to be pressed by the first and/or second piston.

Also, the damping housing may include a body unit that is spaced apart from the second piston by a predetermined distance and has a cylindrical shape with an opened upper portion and a flange unit that is extended from a lower outer circumferential surface of the body unit in a radial direction, and the flange unit may be assembled in the bores.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
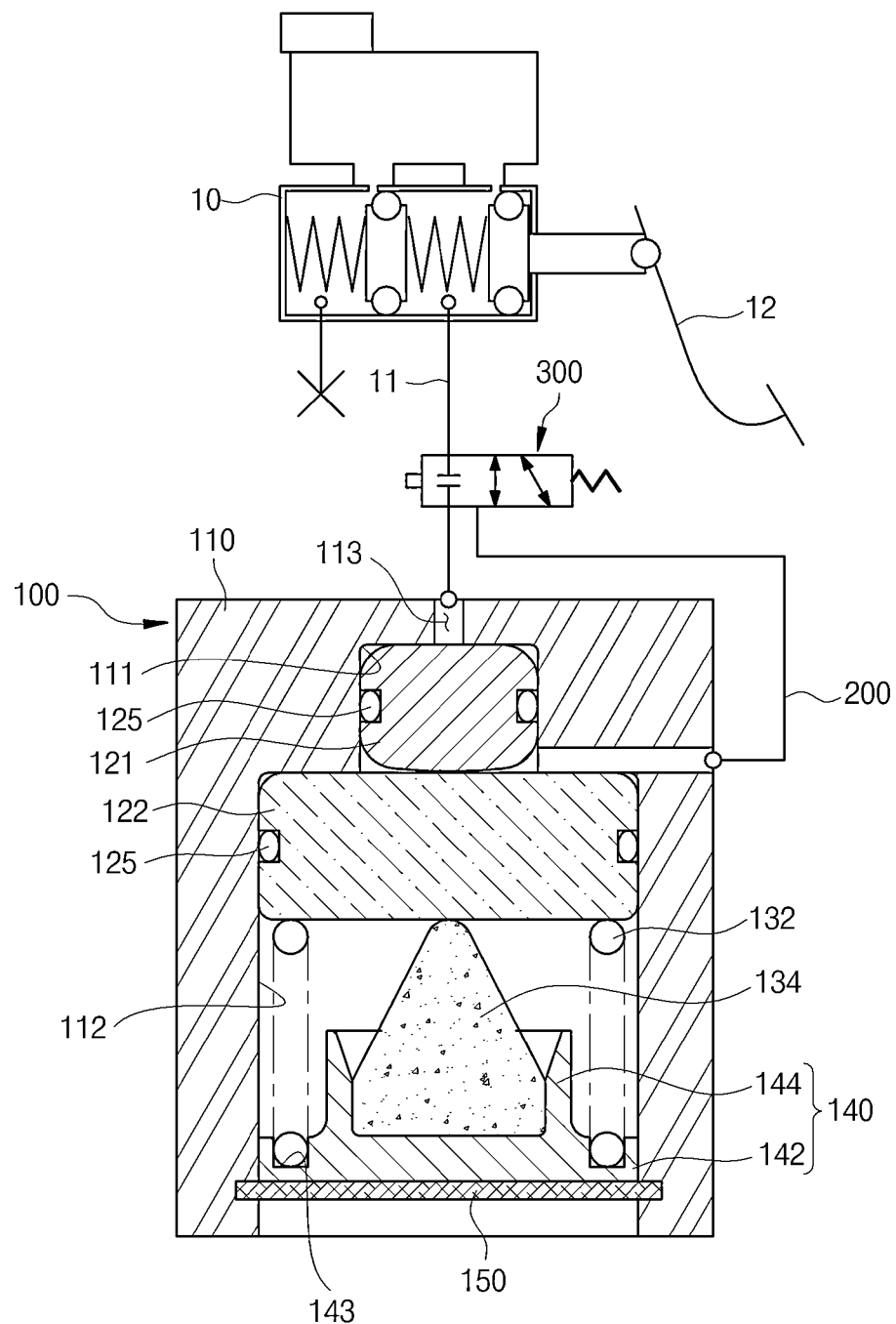
FIG. 1 illustrates a pedal feeling adjusting device according to an embodiment of the present invention.

Reference will now be made in detail to the embodiments of the present invention, examples of which are illustrated in the accompanying drawings, wherein like reference numerals refer to like elements throughout.

FIG. 1 illustrates a pedal feeling adjusting device according to an embodiment of the present invention.

Referring to FIG. 1, the pedal feeling adjusting device according to an embodiment of the present invention includes a pedal simulator 100 that provides pedal feeling to a driver, a hydraulic flow path 200 that is connected to a flow path 11 through which an oil pressure is transmitted to the pedal simulator 100, and a control valve 300 that controls the oil pressure to be selectively transmitted to an oil hole 113 formed in the pedal simulator 100 or the hydraulic flow path 200.

The simulator 100 according to an embodiment of the present invention includes a simulator block 110 that is provided in a master cylinder 10 for generating a braking oil pressure by a brake pedal 12 and in which bores 111 and 112 are formed to receive oil from the master cylinder 10 into the simulator block 100, a damping housing 140 that is used for closing the bores 111 and 112 of the simulator block 110, first and second pistons 121 and 122 which are provided in the bores 111 and 112 so as to be slidably moved, and an elastic member that is supported by the damping housing 140 to provide pedal feeling. In this case, the first and second pistons 121 and 122 are provided in the bores 111 and 112 formed inside the simulator block 110, arranged in series.

The oil hole 113 for allowing the oil pressure to flow in from the master cylinder 10 is formed in an upper portion of the simulator block 110, and the bores 111 and 112 contacting the oil hole 113 are formed in the simulator block 110. In this case, the oil hole 113 is connected to the master cylinder 10 through the flow path 11. In addition, the bores 111 and 112 formed on the simulator block 110 have a stepped shape including the first bore 111 in which the first piston 121 is disposed and the second bore 112 in which the second piston 122 is disposed. As shown in FIG. 1, the first bore 111 has a smaller diameter than that of the second bore 112. In this case, the first and second bores 111 and 112 are formed to have diameters respectively corresponding to the diameters of the first piston 121 and the second piston 122, which will be described later. Here, the diameters of the bores 111 and 112 may be changed in accordance with the diameters of the pistons 121 and 122, and pedal feeling may be adjusted in accordance with the diameters of the pistons 121 and 122.

As described above, the first and second pistons 121 and 122 are arranged in series, and respectively provided in the first and second bores 111 and 112 so as to be slidably moved. A sealing member 125 is provided in each of the pistons 121 and 122 so as to seal gaps between the first piston 121 and the first bore 111 and between the second piston 122 and the second bore 112. In this case, a gap is formed between the first piston 121 and the second piston 122, and when an oil pressure is provided through the hydraulic flow path 200 to be described later, the oil pressure is provided between the first piston 121 and the second piston 122.

The elastic member is provided between the second piston 122 and the damping housing 140, and compressed in accordance with the movement of the first and second pistons 121 and 122 to thereby provide a reaction force to a driver. Such an elastic member includes a reaction force spring 132 and a damping member 134.

The reaction force spring 132 is provided in the form of a coil, the top end of the reaction force spring 132 is supported by a bottom surface of the second piston 122, and the bottom end thereof is supported by the damping housing 140. Such a reaction force spring 132 is compressed when the first piston 121 and/or the second piston 122 are moved, thereby providing the reaction force.

The damping member 134 is made of a rubber material so as to be elastically deformed, and is pressed by the second piston 122 in such a manner as to be brought into contact with the second piston 122 to thereby provide a repulsive force to the brake pedal 12. Such a damping member 134 is provided in the damping housing 140. Here, as shown in FIG. 1, a case in which the upper side of the damping member 134 provided in the damping housing 140 is brought into contact with the second piston 122 is shown, but the present invention is not limited thereto. For example, the damping member 134 may be spaced apart from the second piston 122 by a predetermined distance, and brought into contact with the second piston 122 after the second piston 122 is moved downward by a predetermined distance.

The damping housing 140 is coupled to the simulator block 110 so as to seal the bores 111 and 112. More specifically, the damping housing 140 is spaced apart from the second piston 122 by the predetermined distance to be coupled to a lower end portion of the second bore 112. Such a damping housing 140 includes a body unit 144 that has a cylindrical shape with an opened upper side and a flange unit 142 that is extended from a lower outer circumferential surface of the body unit 144 in a radial direction.

The body unit 144 has a receiving space formed therein, and the damping member 134 is provided in the receiving space. In this case, an inner upper portion of the body unit 144 may have a sloped face that is inclined to face the outer side so that the damping member 134 may be readily elastically deformed.

The flange unit 142 is assembled in the bottom portion of the second bore 112, and includes a support groove 143 for supporting the bottom of the reaction force spring 132 formed on the upper surface thereof. The body unit 144 and the flange unit 142 are integrally formed.

Meanwhile, a cap 150 is provided on a bottom portion of the damping housing 140 so that the damping housing 140 may be stably fixed to the simulator block 110. That is, the cap 150 is fixed to the simulator block 110 to serve to support the damping housing 140.

According to an embodiment of the present invention, in order to provide the oil pressure to the gap between the first and second pistons 121 and 122 of the pedal simulator, the hydraulic flow path 200 is provided. The hydraulic flow path 200 is connected to the flow path 11 to independently compress the second piston 122 by providing the oil pressure generated from the master cylinder 10 to the gap between the first and second pistons 121 and 122. In this case, in order to selectively provide the oil pressure to the oil hole 113 or the hydraulic flow path 200, the control valve 300 is provided in the flow path 11.

The control valve 300 may be provided as a normal close type (NC type) solenoid valve that is usually maintained in a closed state and opened by a control. Thus, the control valve 300 controls the oil pressure to be transmitted to the oil hole 113 or the hydraulic flow path 200 by selectively adjusting, by a driver, the flow direction of the oil pressure while adjusting whether to open or close the control valve 300 through an adjustment switch (not shown). This is in order to vary the reaction force by providing the oil pressure to the pistons 121 and 122 having mutually different diameters. For example, when the oil pressure is provided to the oil hole 113 by the control valve 300, a large force is generated by a short pedal stroke by pressing the first piston 121 through the first bore 111 having the relatively smaller diameter, thereby providing a hard pedal feeling, and when the oil pressure is provided to the hydraulic flow path 200, a small force is generated by a long pedal stroke by pressing the second piston 122 through the second bore 112 having the relatively larger diameter, thereby providing a soft pedal feeling.

Hereinafter, a state in which the pedal simulator is operated through the pedal feeling adjusting device having the above-described structure will be described.

Figure 2:
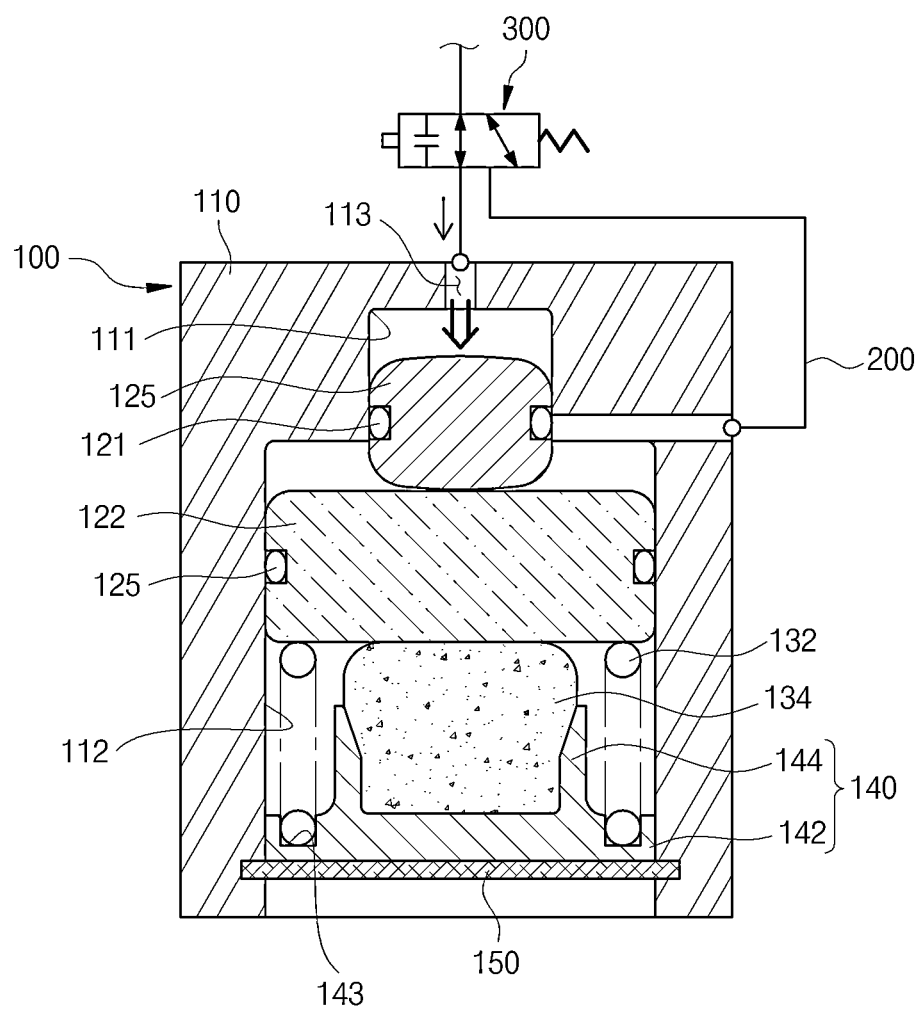
FIGS. 2 and 3 illustrate an operational state of a pedal simulator of a pedal feeling adjusting device according to an embodiment of the present invention.

First, when the flow path 11 is connected to the oil hole 113 by the control valve 300, the oil pressure flows into the first bore 111 from the master cylinder (see, '10' of FIG. 1) through the oil hole 113 of the simulator block 110 as shown in FIG. 2. Thus, the first piston 121 is pushed to move together with the lower second piston 122 to thereby press the elastic member, that is, the reaction force spring 132 and the damping member 134, whereby the repulsive force is generated. In this case, as the oil pressure is supplied to the first bore 111 having the relatively smaller diameter than that of the second bore 112, a movement distance is increased compared to the short pedal stroke, whereby a large force is generated. As a result, a harder than normal pedal feeling may be provided.

Figure 3:
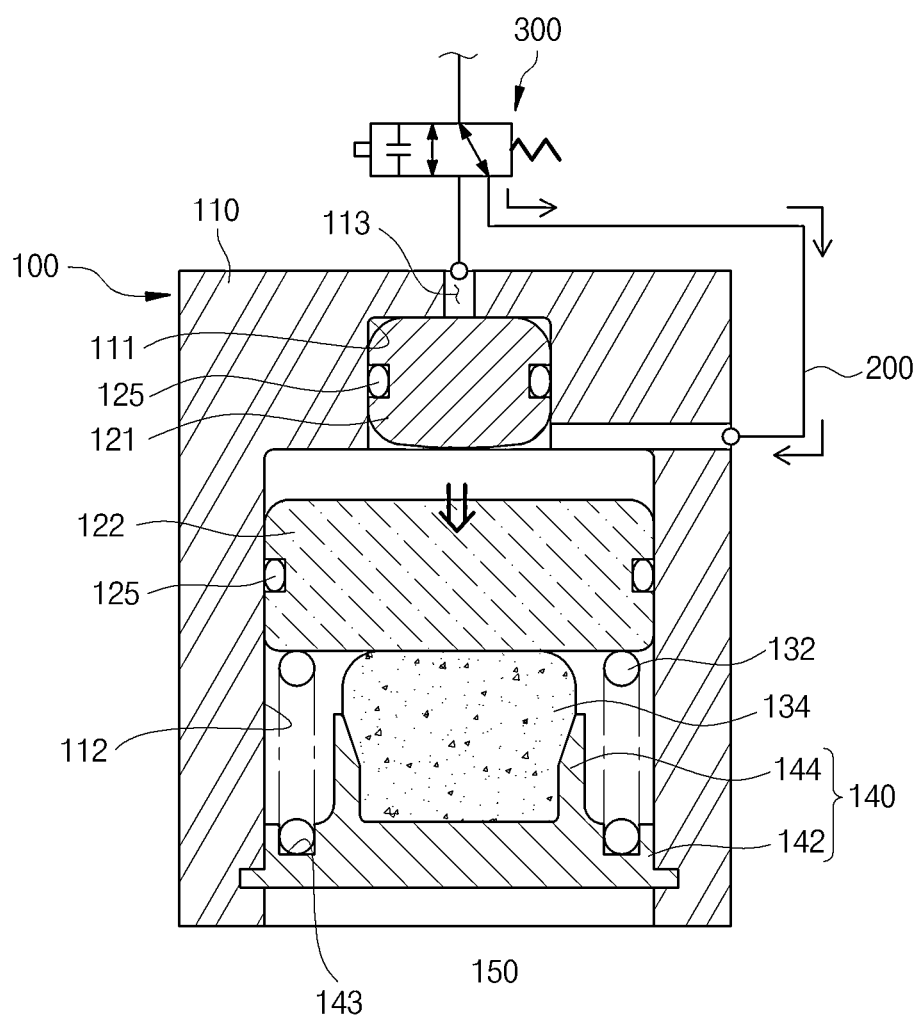

Next, when the flow path 11 is connected to the hydraulic flow path 200 by the control valve 300, the oil pressure flows into the second bore 112 through the hydraulic flow path 200 as shown in FIG. 3. That is, the oil pressure flows into the gap between the first piston 121 and the second piston 122. In this case, the first piston 121 is fixed to the first bore 111, and only the second piston 122 is slidably movable. Then, the second piston 122 is pushed to press the lower elastic member, whereby a repulsive force is generated. Thus, as the oil pressure is supplied to the second bore 112 having the relatively larger diameter than that of the first bore 111, a small force is generated compared to a long pedal stroke, whereby a softer than normal pedal feeling may be provided.

Figure 4:
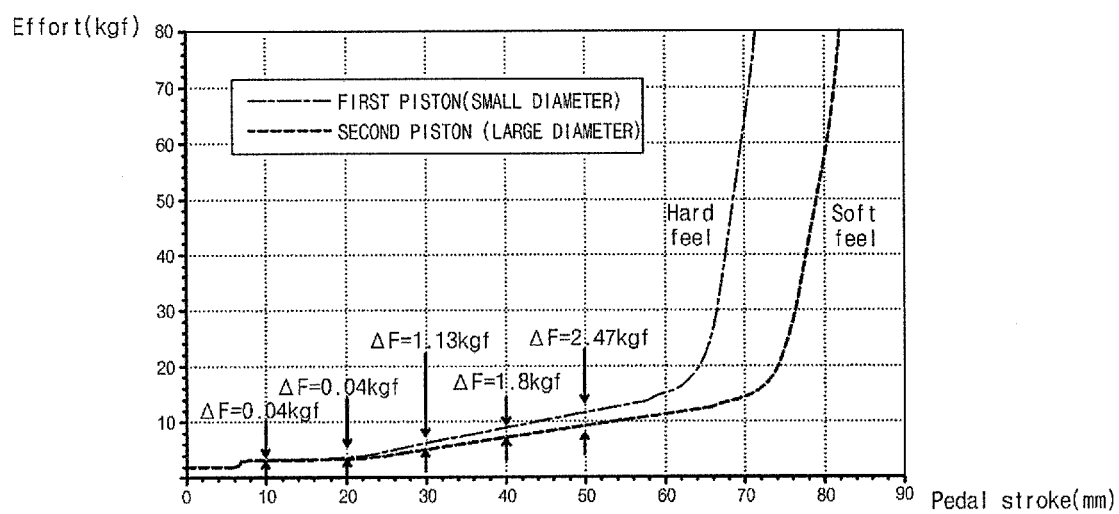
FIG. 4 is a graph illustrating a relationship between a pedal stroke by a pedal feeling adjusting device according to an embodiment of the present invention and pedal feeling.

A change in the pedal stroke distance and a change in state of pedal feeling when pressing the two pistons having mutually different diameters are shown in FIG. 4. As shown in FIG. 4, it may be seen that a large force is generated compared to the pedal stroke distance when pressing the first piston 121, and a small force is generated compared to the same pedal stroke distance as that in the first piston 121 when pressing the second piston 122. In this case, a force observed for each 10 mm of the pedal stroke distance on the graph indicates a difference between the forces generated when pressing the first piston 121 and when pressing the second piston 122 at the same time of movement by the same pedal stroke distance. The difference between the forces is a difference between the forces generated by the difference in diameters of the pistons pressing the elastic member for providing the same elastic force.

Consequently, in the pedal feeling adjusting device according to an embodiment of the present invention, the pistons 121 and 122 having mutually different diameters and the separate hydraulic flow path 200 are provided, and the flow of the oil pressure may be controlled by the control valve 300 by selectively pressing any one of the two pistons 121 and 122, thereby providing pedal feeling that meets the requirement of the driver.

Meanwhile, according to an embodiment of the present invention, the example in which the two pistons 121 and 122 having mutually different diameters are provided in series and any one of the two pistons 121 and 122 is selectively pressed has been described, but the present invention is not limited thereto. For example, at least three pistons having mutually different diameters may be provided, and the oil pressure may be selectively provided to each gap between the pistons.

As described above, in the pedal feeling adjusting device according to the embodiments of the present invention, the pedal reaction force which the driver feels may be changed by adjusting the stroke distance and reaction force of the pedal simulator in such a manner that the two pistons having mutually different diameters are arranged in series and the oil pressure is selectively supplied to the pistons having mutually different diameters by changing the flow path through the hydraulic valve. As a result, it is possible to provide pedal feeling required by the type of the vehicle or the driver.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A pedal feeling adjusting device that adjusts pedal feeling provided to a driver by an oil pressure generated in accordance with pedal effort of the driver, the pedal feeling adjusting device comprising:
    a pedal simulator that includes a simulator block in which an oil hole connected to a master cylinder through a flow path is formed on an upper portion thereof to receive the oil pressure in accordance with the pedal effort of the driver and bores are formed therein to contact the oil hole, a damping housing coupled to seal the bores, first and second pistons provided in series in the bores to be compressed by oil and slidably moved, and an elastic member supported by the damping housing and compressed in accordance with movement of the first and second pistons to provide a reaction force;
    a hydraulic flow path that is connected to the flow path connecting between the oil hole and the master cylinder to provide the oil pressure between the first and second pistons; and
    a control valve that is provided in the flow path to control the oil pressure to be selectively provided to the oil hole or the hydraulic flow path,
    wherein the first and second pistons are formed to have mutually different diameters.

2. The pedal feeling adjusting device according to claim 1, wherein the control valve is provided as a normal close type solenoid valve that is usually maintained in a closed state and opened by a control.

3. The pedal feeling adjusting device according to claim 1, wherein the first piston has a smaller diameter than that of the second piston.

4. The pedal feeling adjusting device according to claim 3, wherein the bores are constituted of a first bore in which the first piston is disposed and which has a diameter corresponding to the diameter of the first piston and a second bore in which the second piston is disposed and which has a diameter corresponding to the diameter of the second piston.

5. The pedal feeling adjusting device according to claim 4, wherein, when the oil pressure is provided through the oil hole, a large force is generated by a short pedal stroke by pressing the first piston having the relatively smaller diameter, thereby providing a hard pedal feeling, and when the oil pressure is provided through the hydraulic flow path, a small force is generated by a long pedal stroke by pressing the second piston having the relatively larger diameter, thereby providing a soft pedal feeling.

6. The pedal feeling adjusting device according to claim 4, wherein a sealing member is provided in the first and second pistons so as to seal gaps between the first piston and the first bore and between the second piston and the second bore.

7. The pedal feeling adjusting device according to claim 1, wherein the elastic member includes
    a reaction force spring that is provided between the second piston and the damping housing and compressed by the first and/or second piston, and
    a damping member that is provided in the damping housing and elastically deformed in such a manner as to be pressed by the first and/or second piston.

8. The pedal feeling adjusting device according to claim 7, wherein the damping housing includes a body unit that is spaced apart from the second piston by a predetermined distance and has a cylindrical shape with an opened upper portion, and a flange unit that is extended from a lower outer circumferential surface of the body unit in a radial direction, and wherein the flange unit is assembled in the bores.

9. The pedal feeling adjusting device according to claim 1, wherein, when the oil pressure is provided through the oil hole, a large force is generated by a short pedal stroke by pressing the first piston having the relatively smaller diameter, thereby providing a hard pedal feeling, and when the oil pressure is provided through the hydraulic flow path, a small force is generated by a long pedal stroke by pressing the second piston having the relatively larger diameter, thereby providing a soft pedal feeling.

* * * * *